March 28, 1944. O. W. BECKER ET AL 2,345,086
APPARATUS FOR THE MANUFACTURE OF ARTIFICIAL SAUSAGE SKINS
Filed May 9, 1938 3 Sheets-Sheet 1
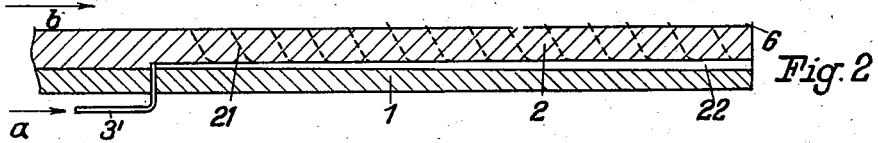
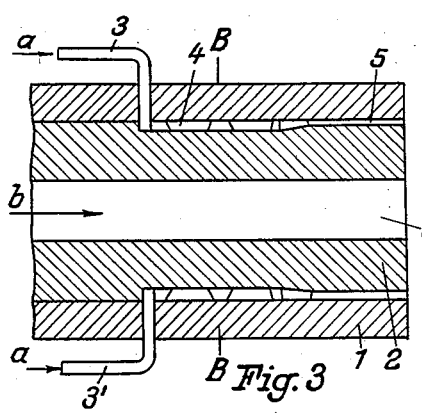
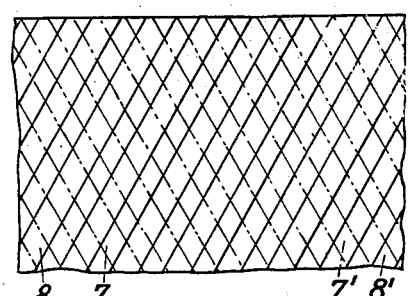
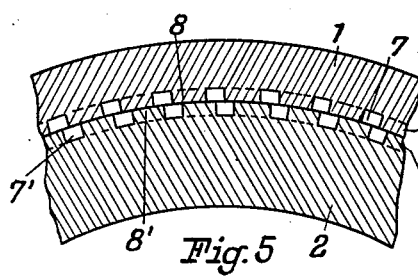
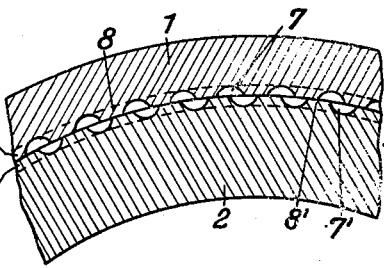
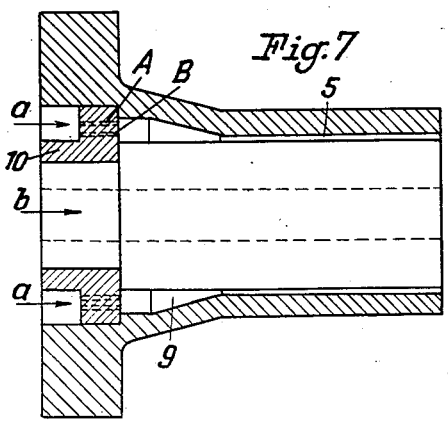
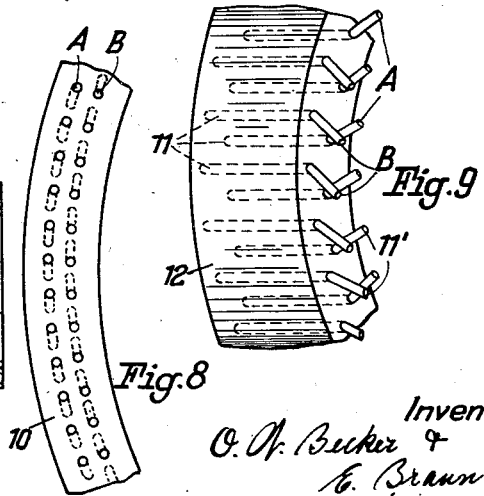
Inventors
O. W. Becker &
E. Braun
By E. F. Wendroth Atty

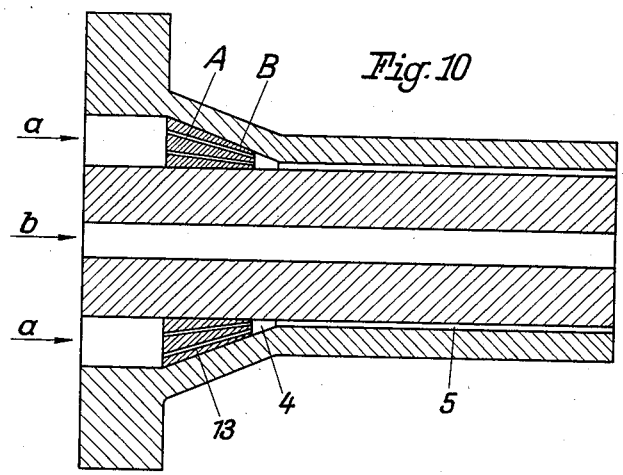
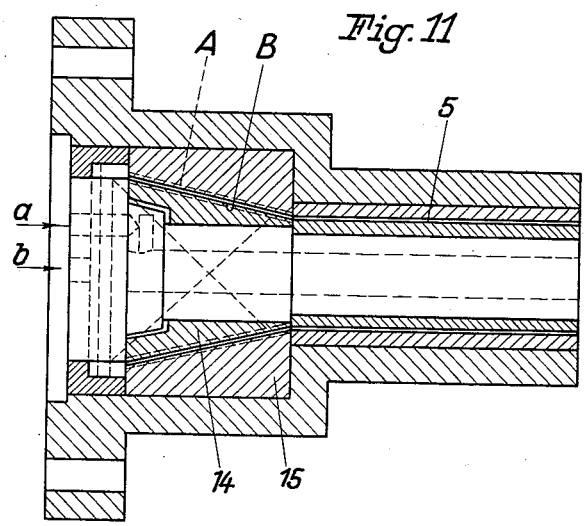
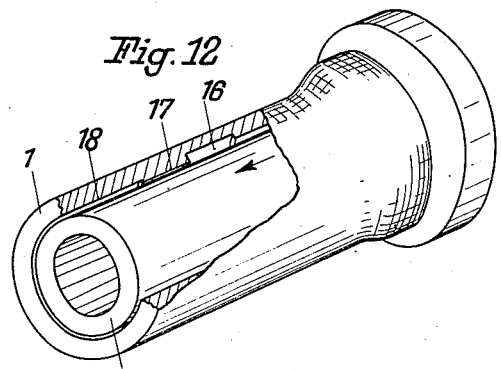

March 28, 1944. O. W. BECKER ET AL 2,345,086
APPARATUS FOR THE MANUFACTURE OF ARTIFICIAL SAUSAGE SKINS
Filed May 9, 1938 3 Sheets-Sheet 3
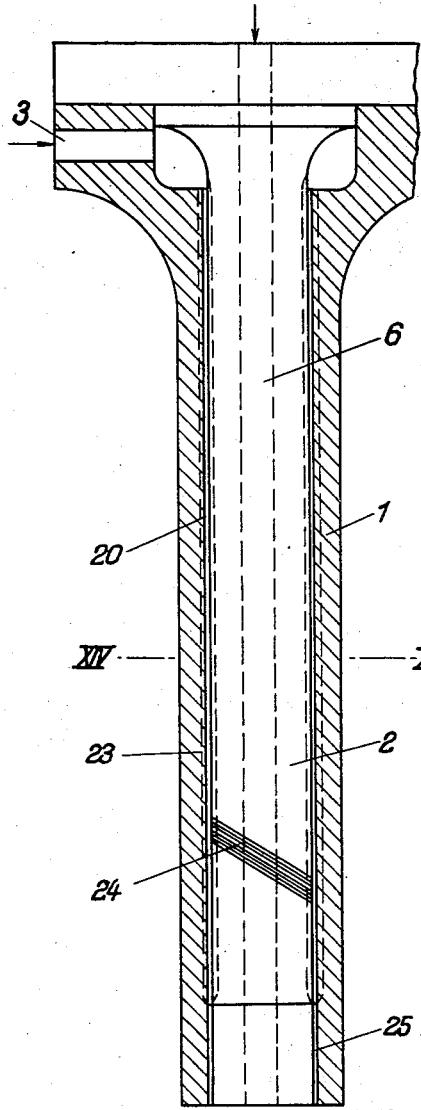
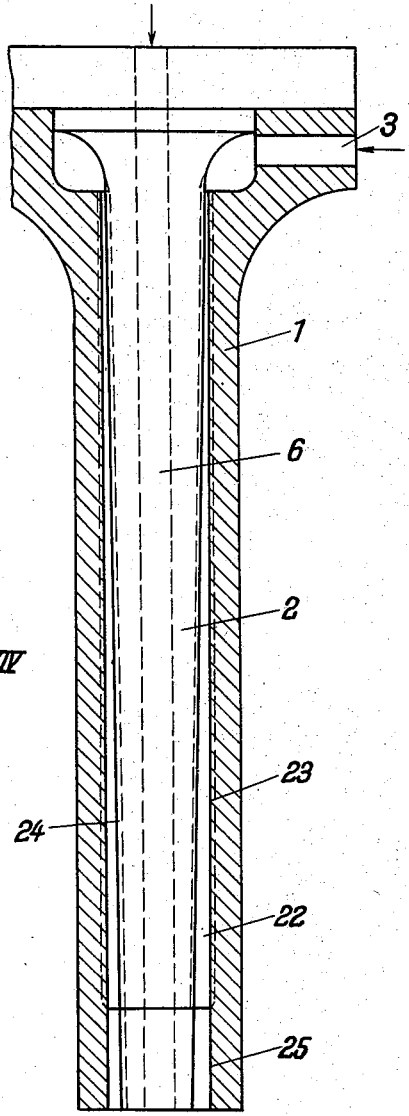
Inventors:
O. W. Becker + E. Braun
By E. F. Wendroth atty Patented Mar. 28, 1944

2,345,086

UNITED STATES PATENT OFFICE 2,345,086

APPARATUS FOR THE MANUFACTURE OF ARTIFICIAL SAUSAGE SKINS

Oskar Walter Becker, Heidelberg, and Emil Braun, Weinheim, Baden, Germany; vested in the Alien Property Custodian Application May 9, 1938, Serial No. 206,948
In Germany January 11, 1936

3 Claims. (Cl. 18—14)

This invention relates to the manufacture of tubular products, particularly suitable for use as artificial sausage skins, by extruding swollen fibrous masses, particularly animal fibrous masses, through annular nozzles.

It has been found that the felted fibres of these masses, which are very viscous, on extrusion through relatively narrow annular nozzles, have a tendency to align themselves in the direction of flow owing to friction against the shaping nozzle parts. Accordingly the fibres for the greater part become disposed parallel in the axial direction of the tube, whereby the strength of the tubular structures is impaired.

When employing stationary nozzles, the requisite de-swelling pressure may for example be produced by employing nozzles of considerable length. In such nozzles the resistance to the passage of the pasty fibrous mass becomes so great, that at a certain position within the nozzle a pressure is produced which brings about the de-swelling of the mass. A zone is accordingly formed in which free water occurs, which enables the individual fibre particles to take up any desired position or to become variously disposed relatively to one another in accordance with the direction-imparting elements disposed in the nozzle.

Various means may be used for promoting the deflection of the fibres in different directions in the flowing mass.

The fibrous mass during its passage through the annular nozzle may be subjected to the action of direction-imparting elements or members, such as bores, ribs, grooves, alterations in the cross-section of the annular nozzle opening, etc. Nozzles may also be employed, the walls of which are provided with helical tracks, preferably of high pitch. In certain cases a plurality of elements as aforesaid may be used in conjunction in order to deflect the fibres. The aforesaid elements must of course be so constructed and disposed, that the fibres are deflected to the necessary extent for effecting strengthening of the tube.

The fibrous mass may be influenced in the desired manner by suitable construction and arrangement of the direction-imparting elements. The fibres may for example be deflected in different layers of the flowing mass, for example in such a way that the fibres in the outer layer of the flowing mass are deflected in one direction and those in the inner layer in the opposite direction, whilst the fibres in the intermediate layer are practically not affected or only slightly affected. Alternatively considerable displacement of the fibres may be effected, for example in such a way that the fibres become extensively interlaced or felted. The flowing mass may for example also be divided into individual thread- or band-shaped streams, which before leaving the nozzle are re-combined to form closed tubular products. In this case the bands or threads in the outer layer may, for example, be deflected in one direction and those in the inner layer in the opposite direction.

In order to effect transverse displacement of the fibres in the zone of the water expressed or liberated from the fibrous mass, a nozzle may for example be employed, the annular space of which becomes enlarged in the direction of flow of the fibrous mass. Such a nozzle accommodates a larger quantity of the mass at its discharge position than at the inlet position. Consequently the mass becomes dammed up in the nozzle, as a result of which some of the fibres become displaced transversely to the direction of flow. The fibres are accordingly in part displaced from their parallel alignment and at least become irregularly disposed relatively to one another, as a result of which the desired strength is imparted to the tubular product. Special direction-imparting elements may in this case also be provided in the nozzle in order to promote the deflection of the fibres.

A certain displacement of the fibres may also be achieved by reducing the annular space of the nozzles by constrictions or the like, if desired at several places. As a result thereof the fibres become dammed up and deflected in front of each constriction, whilst after passing the constriction a certain expansion takes place, which may give rise to vortex and the like movements. The part of the nozzle adjacent to the outlet position is in this case so constructed that the fibrous masses at this position acquire their final shape, wall-thickness and strength.

Satisfactory results may for example be obtained with a nozzle 400 mms. in length and 50 mms. in diameter having an annular space 0.5 mm. wide and helical grooves 1 mm. deep, 1 mm. wide and of 80 mms. pitch. Depending on the quantity of swelling water contained in the fibrous mass and the rate of travel, nozzle lengths of about 300 mms. to about 600 mms. are suitably operated at pressures of about 80 to about 300 atms. When employing a nozzle as aforesaid for a fibrous mass derived from animal hide and containing about 90% of swelling water, a pressure of at least 100 atms. is necessary with a rate of travel of 10 cms. per second. Still more favourable results are obtained if the pressure is raised to 150–250 atms.

In the case of a conically expanding nozzle it has for example been found that a nozzle 400 mms. in length and 50 mms. in diameter having an annular space which gradually increases in width from 0.2 mm. at the inlet end to 0.5 mm. at the outlet end yields satisfactory results. Such a nozzle may of course also be provided with helical grooves, which increase the effect already produced by the enlargement of the annular space. The invention is not limited to the above indicated dimensions of the conically enlarging annular space, satisfactory results being also obtained with a nozzle between 250 mms. and 600 mms. in length having an annular space which gradually increases in width from about 0.1 mm. at the inlet end to about 0.8 mm. at the outlet end.

The elements employed for displacing the fibres may be disposed in groups arranged if desired at different distances from the longitudinal axis of the nozzle. They may be disposed in the walls of the nozzle itself or in separate attachments.

A few embodiments of apparatus according to this invention are illustrated in the accompanying diagrammatic drawings, in which:

Fig. 1 is a longitudinal section through a long nozzle with helical grooves in the inner walls thereof, Fig. 2 is a similar view to Fig. 1, but with the difference that the width of the annular space of the nozzle is conically enlarged, Fig. 3 is a longitudinal section through a part of a nozzle provided with direction-imparting elements in the annular space thereof, Fig. 4 is an enlarged plan view of a part of an unwound surface with fixed direction-imparting elements disposed thereon, Fig. 5 is an enlarged cross-section along the line B—B of Fig. 3 and shows one embodiment of the direction-imparting elements, Fig. 6 is a similar view to Fig. 5 and shows another embodiment of the direction-imparting elements, Fig. 7 is a longitudinal section through a nozzle provided with a separate circular attachment serving to orient the fibres, Fig. 8 shows on an enlarged scale a part of the circular attachment of Fig. 5 provided with direction-imparting elements, Fig. 9 is a perspective view of a part of a circular attachment provided with direction-imparting elements, Figs. 10 and 11 are longitudinal sections through two embodiments of nozzles according to the invention, Fig. 12 is a perspective view partially cut away of a nozzle, in which a certain displacement of the fibres is obtained by the arrangement of elements in the interior of the annular space, some of which reduce and others enlarge the cross-section of the space in the direction of flow, Fig. 13 is a longitudinal section through a long nozzle with an annular space of uniform width, Fig. 14 is a cross-section along the line XIV—XIV of Fig. 13, and Fig. 15 is a longitudinal section through a long nozzle with an enlarging annular space.

Referring to the drawings, the nozzle illustrated in Fig. 1 consists of a hollow casing or jacket 1, in which a likewise hollow cylindrical core 2 is disposed. Both parts are fixed in relation to one another. The fibrous mass passes in the direction of the arrows a through the tubes 3 and 3' into the annular nozzle space 20, from which the fibrous mass discharges in the form of a tubular product. In the embodiment according to Fig. 1 the annular space is of uniform width. The direction-imparting elements consist of helical grooves 21, which may be disposed in the walls of the nozzle parts 1 and/or 2. In the embodiment according to Fig. 2 the annular space 22 gradually increases in width from the inlet to the outlet end. The fibrous mass is forced under high pressure through the tubes 3 and 3' into the annular space 20 or 22 and expressed from this space 5, the operation being carried out continuously. The tubular product is maintained in a stretched condition by compressed air which flows in the direction of the arrow b, through the hollow space 6 of the core 2.

According to Fig. 3 the annular space 4 in which the fixed direction-imparting elements are disposed, is continued in the annular space 5. The direction-imparting elements in the annular space 4 may be constructed in the form of grooves 7 (Fig. 4) which are separated by ribs 8. The grooves, as shown in Figs. 5 and 6 (the grooves in Fig. 5 being rectangular and in Fig. 6 of semi-circular cross-section) are in part disposed in the jacket 1 and in part in the core 2. It is essential that the grooves and ribs of one part should intersect those of the other part as shown in Fig. 4, the elements 7' and 8' of the non-visible part being indicated by dot and dash lines.

The grooves of one part, for example the jacket 1, deflect the fibres on their passage through the annular space 4 in one direction, whilst the elements of the other part deflect the fibres in the opposite direction. Since both directions cross, the fibres become interlaced and in part crossed above one another.

As hereinbefore described the fibres may be superimposed in layers by disposing the direction-imparting elements in groups at different distances from the longitudinal axis of the nozzle. One group, for example, comprises the elements disposed in the jacket 1 and the second group the elements disposed in the core 2. In Figs. 5 and 6 the two groups are indicated by A and B.

In the embodiment according to Fig. 7 the fixed direction-imparting elements are disposed in a separate attachment in the nozzle. The nozzle in this case is also provided with an outlet annular space 5 and a pre-disposed annular space 9, into which the direction-imparting elements, here shown as bores, open. These bores are disposed in the flange of a ring 10 which is inserted in the nozzle. The mass again passes in the direction of the arrow a and the air again in the direction of the arrow b. The bores are again disposed in two groups A and B in the flange of the ring 10 at different distances from the longitudinal axis of the nozzle. As shown in Fig. 8, the bores are obliquely disposed in the flange of the ring 10 and not parallel to the nozzle axis. It is essential that in the one group A the bores should proceed obliquely in the opposite direction to the bores in group B.

In the embodiment illustrated in Fig. 9 the fixed direction-imparting elements consist of small tubes 11 disposed in a support 12. This may again be a ring or an annular flange as in Figs. 7 and 8. The tubes are disposed in bores in the support 12, which proceed parallel to one another and to the nozzle axis. The bent-over parts 11' of the tubes projects from the holes into the discharge space of the annular space in advance thereof. These parts are again bent in different directions in two different groups A and B, so that, owing to the different distance of these groups from the nozzle axis, the fibres become disposed in layers.

In the nozzle illustrated in Fig. 10 the direction-imparting elements take the form of bores in a conical attachment 13. These bores are again disposed in groups A and B at different distances from the nozzle axis. The mass again enters in the direction of the arrow $a$ and is pressed through the bores of the groups A and B under high pressure into the annular space 4 which is disposed in advance of the outlet annular space 5 of the nozzle. The air for maintaining the tubular product discharging from the nozzle under tension is also in this case introduced in the direction of the arrow $b$ into the hollow inner space.

In the nozzle illustrated in Fig. 11 an attachment is likewise provided, in which the direction-imparting elements are in the form of bores. The attachment in this case is in two parts. It consists of a hollow conical part 14 disposed in a conical bush 15. In this case also two groups of bores or grooves are provided, group A being disposed in the inner conical surface of the bush and group B in the outer conical surface of the hollow conical part 14. The mass enters in the direction of the arrow $a$ and is passed through bores to the tapering groove-shaped bores of the groups A and B. The air enters the inner space of the nozzle in the direction of the arrow $b$. The groove-shaped bores of the attachment discharge directly into the outlet space 5 of the nozzle.

In the embodiments illustrated in Figs. 10 and 11 the bores or grooves of one group are of course disposed in an opposite direction to the bores or grooves of the other group. The fibres are thereby deflected in different directions, as in the other embodiments. The only difference is that in the embodiment of Fig. 10 the fibres are only superimposed in layers after their discharge from the attachment 13 into the annular space 4, whereas in the embodiment of Fig. 11 the fibres may become entirely or partially so disposed inside of the attachment 14, 15.

In all cases more than two groups of direction-imparting elements, each disposed at a different distance from the nozzle axis, may be provided.

In all the described embodiments the fibrous mass is divided into individual thread- or band-shaped streams, which are subsequently combined in layers to form the tubular product. The parts, particularly the direction-imparting elements and the surfaces on which they are disposed, may however be so constructed that the fibrous mass traverses the direction-imparting elements already in the form of a tubular product, longitudinal projections being then formed only by ribs, grooves or the like, the direction of which in each group is different to that in the others.

In the embodiment according to Fig. 12 the fibrous material flowing in the direction of the arrow between the hollow core 2 and the jacket 1 is released from tension by the action of the grooves 16, which proceed at right angles to the longitudinal axis or may be disposed in helicals, and is dammed up by the ribs 17, which reduce the nozzle cross-section for certain distances. Vortex movements are produced thereby, which cause the fibres to become interlaced and superimposed, the fibres whilst in this condition passing through the outlet annular space 17 of usual cross-section and being accordingly fixed in this condition in the finished tube. The ribs and grooves may be disposed in the jacket and/or in the core. If desired they may be disposed at an angle to one another.

Two preferred embodiments of a long nozzle are illustrated in Figs. 13 to 15. In the embodiment of Figs. 13 and 14 the annular space is of uniform width and in that of Fig. 15 of gradually increasing width. The fibrous mass is pressed through the bore 3. A longitudinal bore 6 is provided in the core 2, through which compressed air is supplied to the tubular product discharging from the nozzle, in order to maintain the tube in a stretched condition. Helical tracts 23 and 24 are provided in the inner wall of the jacket 1 and the outer wall of the core 2 respectively. They are preferably of the same pitch but of different twist, the helical tract in the jacket having for example a right-handed twist and the outer helical 24 of the core a left-handed twist. The helical tracts are not continued to the nozzle outlet, but end a certain distance behind the same, so that the bore of the jacket 1 and the outer surface of the core 2 are smooth along the distance 25.

What is claimed is:

1. An apparatus for the production of artificial sausage casings from a swollen fibrous mass comprising a stationary tubular housing, a stationary core located within said housing and forming therewith an annular space, means for feeding said fibrous mass to the said annular space, means for subjecting said fibrous mass to such a pressure within the annular space that the mass is in a partially de-swollen state and means for positioning the fibers of said mass during their passage through said annular space, said means comprising stationary directing elements located on the walls of said annular space and extending in different directions.

2. An apparatus as set forth in claim 1 wherein said means for positioning said fibers comprises helical passages provided on the walls of said annular space.

3. An apparatus according to claim 1 wherein said means for positioning said fibers during their passage through said annular space comprises directing elements disposed in groups located at different distances from the longitudinal axis of said housing.

OSKAR WALTER BECKER.
EMIL BRAUN.